2 Sheets--Sheet 1.

E. C. DEWERS.
Mowing-Machine.

No. 159,804.  Patented Feb. 16, 1875.

WITNESSES
E. H. Bates
George E. Upham.

INVENTOR
E. C. Dewers
By Chipman and Fosmer & Co.
ATTORNEYS.

THE GRAPHIC CO.PHOTO-LITH.39 & 41 PARK PLACE,N.Y.

2 Sheets--Sheet 2.

E. C. DEWERS.
Mowing-Machine.

No. 159,804.  Patented Feb. 16, 1875.

WITNESSES  
E. H. Bates  
George E. Uphaus

INVENTOR  
E. C. Dewers  
By Chipman Hosmer & Co  
ATTORNEYS.

UNITED STATES PATENT OFFICE.

EDMUND C. DEWERS, OF TOWANDA, PENNSYLVANIA.

IMPROVEMENT IN MOWING-MACHINES.

Specification forming part of Letters Patent No. 159,804, dated February 16, 1875; application filed February 28, 1874.

*To all whom it may concern:*

Be it known that I, E. C. DEWERS, of Towanda, in the county of Bradford and State of Pennsylvania, have invented certain novel Improvements in Mowing-Machines; and I do hereby declare that the following is a full, clear, and exact description of the same, reference being had to the accompanying drawings, making part of this specification, in which—

Figure 1:
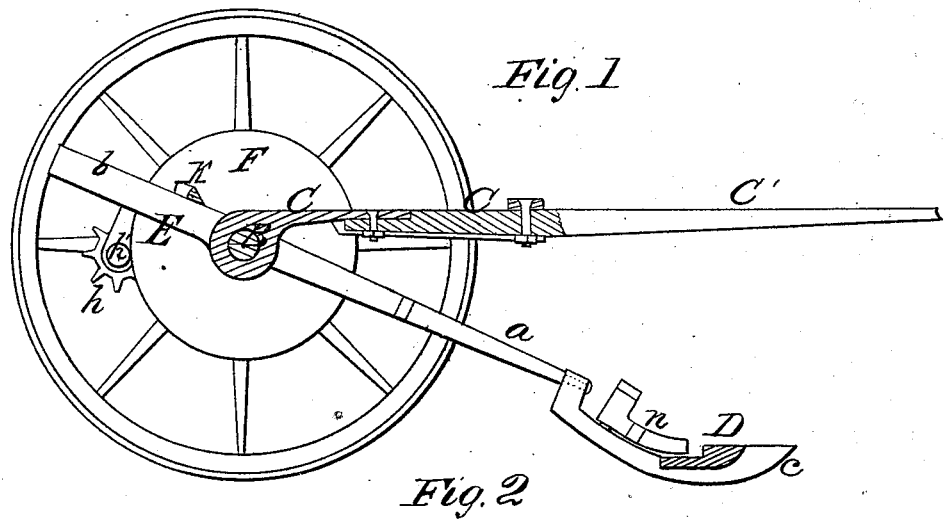
Figure 2:
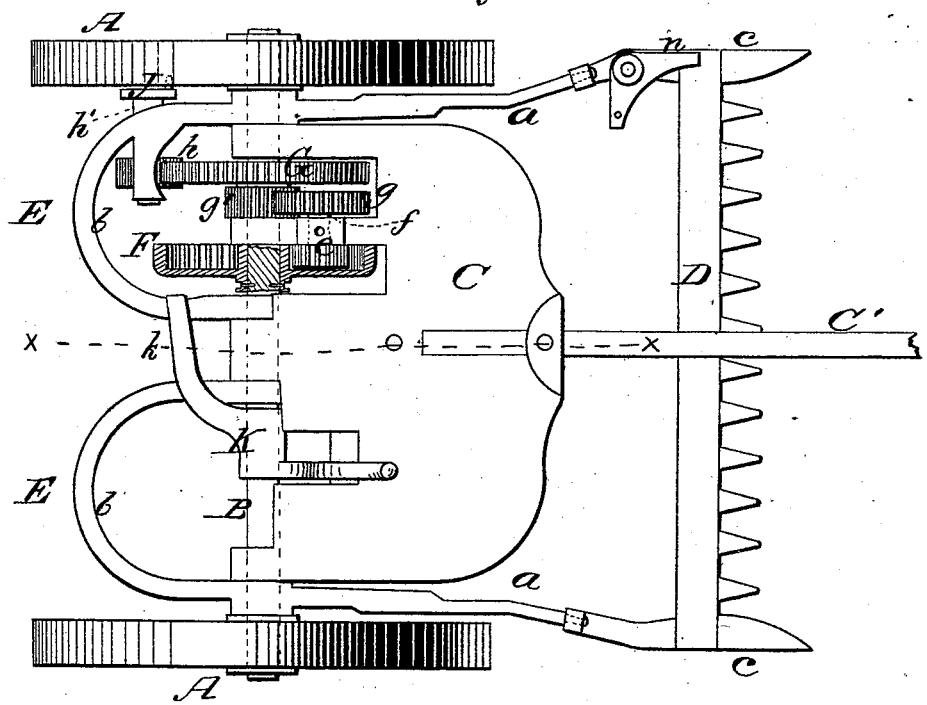
Figure 3:
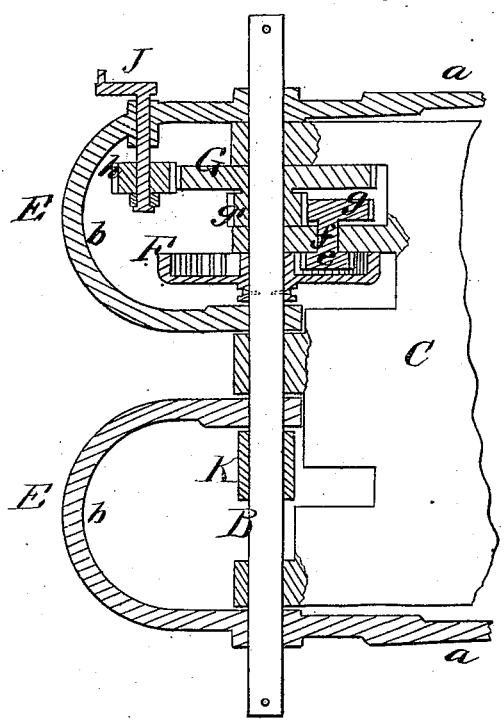

Figure 1 is a vertical section through the machine, taken in the plane indicated by dotted line $x\ x$ on Fig. 2. Fig. 2 is a plan view, showing one of the spurred wheels in section. Fig. 3 is a sectional detail of the gearing for moving the sickle.

Similar letters of reference indicate corresponding parts in the several figures.

This invention has relation to the front-cutting mowing-machines, wherein the cutters are arranged in front of the draft-frame, the animals walking in front of the cutters. It consists mainly in a novel arrangement of the spurred gearing, which drives the sickle, as hereinafter more fully described. It also consists in a lifting and depressing lever, having its fulcrum on the main axle, in combination with the independently-movable frames carrying the finger-bar, as will be hereinafter explained.

The following is a description of my improvements.

In the annexed drawings, A A designate two transporting and driving wheels, which I shall apply on an axle, B, by means of ratchets and pawls, so that when the machine is moved foward the axle will turn with its wheels, and when the machine is backed the wheels will turn loosely around the axle. C represents the platform, on which the driver's seat will be mounted; and C' is the draft-tongue, to which the horses will be hitched, so that they will walk in front of a finger-bar, D. The rear end of the platform C is pivotally connected to the axle B, so that the latter is free to rotate. E E are two frames, which are applied on the axle B, so as to vibrate vertically. The front portions or arms $a\ a$ of these frames extend forward of the axle B, and have pivoted to them the end shoes $c\ c$ of the finger-bar D, the length of which bar is greater than the distance between the transporting-wheels A A, so that neither one of these wheels will roll on the uncut grain.

The rear portions, $b$, of the two frames E E are semicircular, or nearly so, and their forwardly-curved ends terminate in eyes, through which the axle B passes freely. These rear portions extend back of the axle B.

F represents a spur-wheel, which is keyed on the axle B, and which engages with the teeth of a pinion, $e$. This pinion $e$ is keyed on a short shaft, $f$, having its bearing in the rear portion of the platform C in front of the axle B, on which shaft another spur-wheel, $g$, is keyed, which engages with a pinion, $g'$.

The pinion $g'$ and a large spur-wheel, G, are both connected together, and turn freely around the axle B, on which they have their bearings; and the wheel G engages with a pinion, $h$, on a short shaft, $h'$, which is borne in rear of the axle B by one of the frames E.

The outer end of the short shaft, $h'$, has keyed on it a crank-wheel, J, to the wrist-pin of which the rear end of the pitman-rod, which drives the sickle, is attached. The forward end of the pitman-rod will be attached to a cranked or angular lever, $n$, to which one end of the sickle-bar is suitably pivoted.

K designates an angular lever, which is applied loosely on the axle B. The rear arm, $k$, of this lever bears on the two inwardly-curved extremities of the two frames E E, in rear of the axle B, and the front arm of this lever K bears at times on the rear end of the platform C.

It is by means of this lever K that the front ends of the two frames with their finger-bar can be raised or depressed.

The tendency of the wheel G is to depress the rear portion of the left-hand frame E, and to balance, or nearly balance, the finger-bar.

I obtain a free articulation of the finger-bar without complex jointed connections between its ends and the carrying-arms; also, that both frames E E can be simultaneously raised or lowered by a single lever, which has its bearing on the axle B.

Having described my invention, I claim—

1. The combination of the spur-wheels F $g'$ G, having their bearings on the axle B, and the spur-wheels $e\ g$, having their bearings on a platform, C, which articulates on this axle, and with a pinion, $h$, which has its bearings in rear of said axle on an independent frame, E, substantially as described.

2. The lifting-lever K, having its bearing on the axle B, in combination with the frames E and platform C, substantially as described.

E. C. DEWERS.

Witnesses:
L. T. ROYSE,
WM. KELLER.